United States Patent [19]
DelCoco et al.

[11] Patent Number: 4,604,650
[45] Date of Patent: Aug. 5, 1986

[54] THREE LINE VIDEO SCRAMBLING METHOD

[75] Inventors: Robert J. DelCoco, Severn, Md.; Gerald M. Borsuk, Washington, D.C.; Donald R. Lampe, Ellicott City, Md.

[73] Assignee: Westinghouse Electric Corp., Pittsburgh, Pa.

[21] Appl. No.: 495,549

[22] Filed: May 17, 1983

[51] Int. Cl.⁴ .................. H04N 7/167; H04L 9/00
[52] U.S. Cl. .................. 358/119; 358/123; 178/22.12; 178/22.19
[58] Field of Search .................. 358/119, 123; 178/22.01, 22.17, 22.19, 22.12

[56] References Cited

U.S. PATENT DOCUMENTS

| | | | |
|---|---|---|---|
| 2,972,008 | 2/1961 | Ridenour et al. | 358/123 |
| 3,872,503 | 3/1975 | Shutterly | 360/8 |
| 4,266,243 | 5/1981 | Shutterly | 358/121 |
| 4,396,946 | 8/1983 | Bond | 358/119 |
| 4,405,942 | 9/1983 | Block et al. | 358/119 |

Primary Examiner—S. C. Buczinski
Assistant Examiner—Linda J. Wallace
Attorney, Agent, or Firm—W. G. Sutcliff

[57] ABSTRACT

The invention comprises a system for scrambling, transmitting and descrambling the video portion of a TV signal. In the preferred embodiment two serial memories (charge coupled devices) are utilized to store data representing selected portions of the video to be scrambled. The charge coupled devices are selectively clocked to interchange portions of video, with the point at which the interchange occurs determined by a code pattern generator and changing in a predetermined manner. The point of interchange is updated or changed as determined by a code pattern generator and changing every three lines of the TV signal. Descrambling is accomplished by an identical hardware arrangement with the exception that the code pattern generator at the descrambler is synchronized with the code pattern generator in the scrambler. Synchronizing information can be transmitted to the descrambler in any convenient fashion including inserting the data in an unused video line of the vertical retrace interval.

3 Claims, 3 Drawing Figures

THREE LINE VIDEO SCRAMBLING METHOD

BACKGROUND OF THE INVENTION

1. Field of the Invention

The invention relates to scramblers for TV video signals and more particularly to scramblers using serial memories which are preferably charge coupled devices.

2. Description of the Prior Art

Scramblers for TV signals which interchange portions of the video information to scramble the signal are well known in the art. Typical examples of such scramblers and related apparatus are disclosed in U.S. Pat. Nos. 3,872,503 and 4,266,243. All of these patents are assigned to the same assignee as the current application. In these prior art systems the video signal was first sampled to generate digital numbers representative of the amplitude of the video signal. These digital numbers were stored in a digital memory. Sufficient memory was provided to store digital numbers representing at least two scan lines of the video signal. The stored data was then read with the beginning and end portions of the video signal corresponding to a scan line interchanged on a random basis to scramble the TV signal. Although these systems functioned for their intended purpose the hardware was more complex than the scrambler which is the subject of this invention.

SUMMARY OF THE INVENTION

The preferred embodiment comprises a system and apparatus for scrambling, transmitting and descrambling the video portion of a TV signal. The preferred scrambling apparatus includes a first and second memory each including sufficient storage to store data representing at least the video signal corresponding to one scan line of the TV signal. Control circuitry is utilized to store data in and read data from the memories to generate a scrambled TV signal in which each video line of the scrambled picture includes video information which is displaced in time from its normal location. The selection of a portion of a video line to be interchanged or displaced is controlled by a pattern generator which may be a random number generator. The value of the random number generator may be changed every three lines of the TV signal. At the point of utilization, the video signal is descrambled using essentially identical apparatus except that the random number generator used in the descrambler must be synchronized with the random number generator utilized in scrambling. This synchronization can be accomplished by transmitting the synchronizing data during an unused line of the vertical retrace interval, for example.

DESCRIPTION OF THE PREFERRED EMBODIMENT

Figure 1:
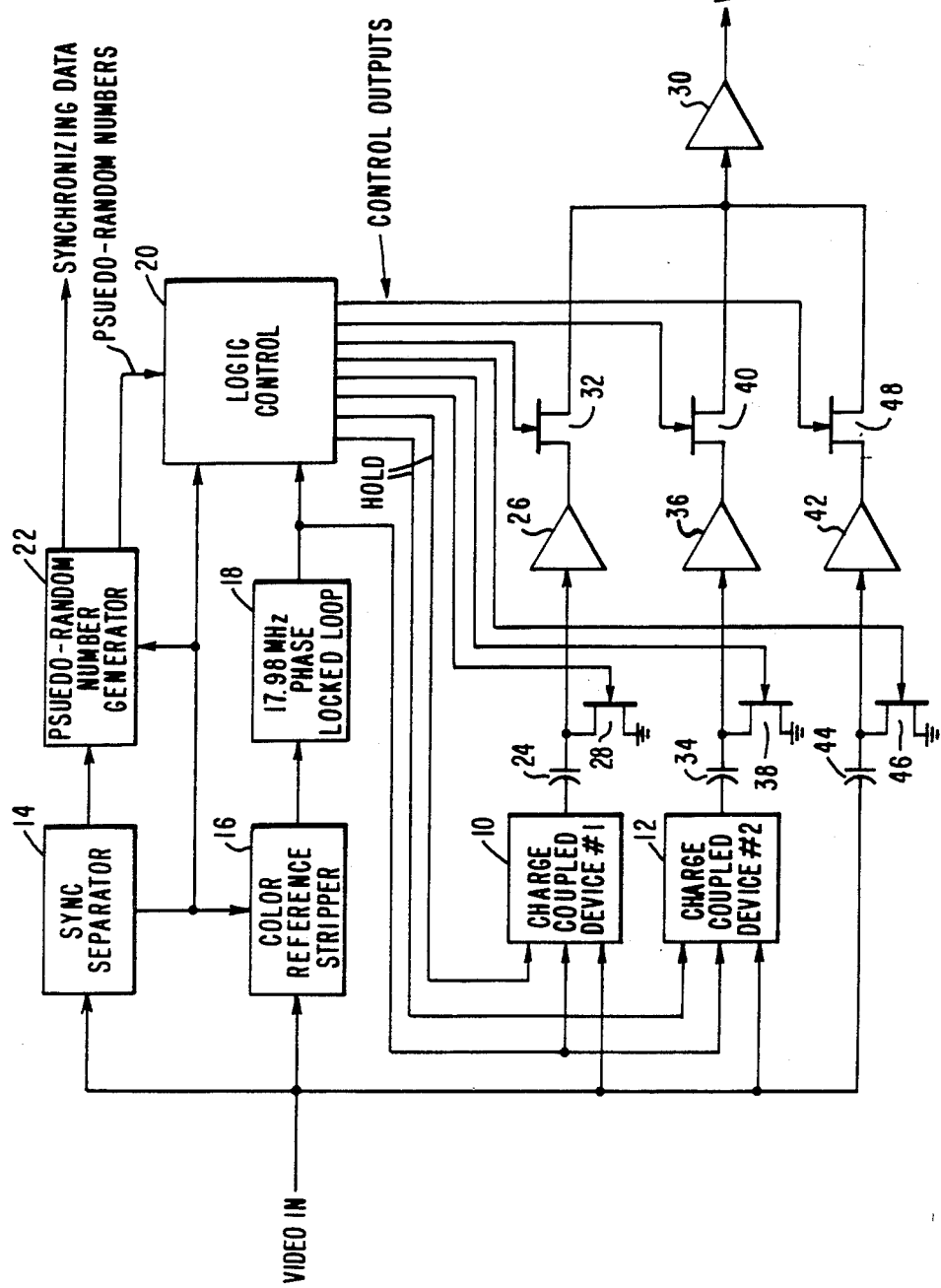
FIG. 1 is a diagram illustrated in the preferred embodiment of the invention.

FIG. 1 is a diagram illustrating the preferred embodiment of the invention. The video portion of a standard TV signal is coupled to the input terminals of first and second charge coupled storage devices 10 and 12. The video signal is also coupled as an input to a sync-separator circuit 14 and a color reference stripper circuit 16. In response to the video signal, the sync-separator circuit 14 separates the synchronization signals, including the color reference, from the composite signal and couples the resulting information as an input to the color reference stripper circuit 16 and to a control logic section 20, and to the pseudo random number generator 22. In response to the synchronization signals from the sync-separator circuit 14 the color reference stripper circuit 16 recovers the 3.58 MHz color reference signal from the composite sync-signal. A phase lock loop circuit 18 is coupled to receive as an input the 3.58 MHz output signal of the color reference stripper circuit 18 and generates a 17.98 MHz output signal (five times 3.58 the color burst) which is phase locked to the color reference signal. The 17.98 mHz signal is five times the frequency of the color reference signal. It is believed that a ratio of four would be preferable. The higher ratio was dictated by the available charge coupled storage devices. Charge coupled storage devices 10 and 12 utilize the phase lock 17.98 MHz signal as a clock signal to store data (a signal) representing the video portion of the TV signal in the charge coupled devices as will be discussed in more detail below.

The synchronization output signals from the sync-separator 14 are also coupled to a pseudo random number generator 22. In response the pseudo random number generator 22 generates two output signals the first being a synchronizing data signal which is utilized by the descrambler to synchronize a similar pseudo random number generator for descrambling, and the second is a pseudo random number which is coupled to the logic circuit 22. The synchronizing data signal may be combined with the scrambled TV signal during an unused line of the vertical blanking interval for transmission to the descrambler, as is common in the prior art. In response to the sychronization output signals from the generator 14, the random number output from the random number generator 22, and the 17.98 MHz clock from the phase lock loop circuit 18, the logic circuit 20 generates first and second hold signals. The hold signals are coupled to the first and second charge coupled memory devices 10 and 12 to control the storage of the video signal in these devices. That is to say, the hold signals control the shifting of data representing the video signal into the charge coupled storage devices 10 and 12.

It should also be noted that patterns of numbers other than pseudo random numbers can be utilized to scramble the TV signal. This is accomplished by modifying the pseudo random number generator 22 to generate the desired pattern. Also in this embodiment the pseudo random number generator is incremented one step for each three lines of the TV signal.

The output data signal of the first charge coupled device 10 is coupled through a capacitor 24 to the input terminal of an amplifier 26. The signal input terminal of amplifier 26 is coupled to a reference signal through a first field effect transistor switch 28 or some other suitable switch. The output terminal of amplifier 26 is coupled to the input terminal of a driver amplifier 30 by a second field effect transistor switch 32. Similarly, the output signal of the second charge coupled device 12 is coupled by a capacitor 34 to the input of a second amplifier 36. A transistor switch 38 couples the signal input terminal of amplifier 36 to the reference with the signal output terminal of this amplifier coupled by another switch 40 to the signal input terminal of the driver amplifier 30. Similarly, the video input signal is coupled to the signal input terminal of an amplifier 42 by a coupling capacitor 44. A switch transistor 46 couples the signal input terminal of amplifier 42 to the reference with switch 48 coupling the signal output terminal of this amplifier to the signal input terminal of the driver amplifier 30. The switching transistors 28, 38, 46, 32, 40 and 48 are controlled by signals generated by the control logic 20 such that a portion of each line containing the synchronizing data, including the color burst is coupled through amplifier 42 to the signal output terminal of the scrambler. During the time interval when the first charge coupled device 10 is being shifted the output data signal of this device representing the video signal corresponding to a whole or a portion of a line of the TV signal is coupled through capacitor 24 and amplifier 26 and switching transistor 32 to the signal input terminal of the driver amplifier 30. Similarly, when the second charge coupled device 12 is being shifted the output data signal from this device representing the video signal corresponding to a whole or a portion of a line of the TV signal is coupled through capacitor 34 and amplifier 36 through the signal input terminal of the buffer amplifier 30. The shifting of the charge coupled devices 10 and 12 along with the bypass of the sync signals around these devices is controlled by the control logic 20 to scramble the video signal as described in more detail below with reference to FIG. 2 which is a waveform diagram illustrated in the scrambling of the video signals.

Figure 2:
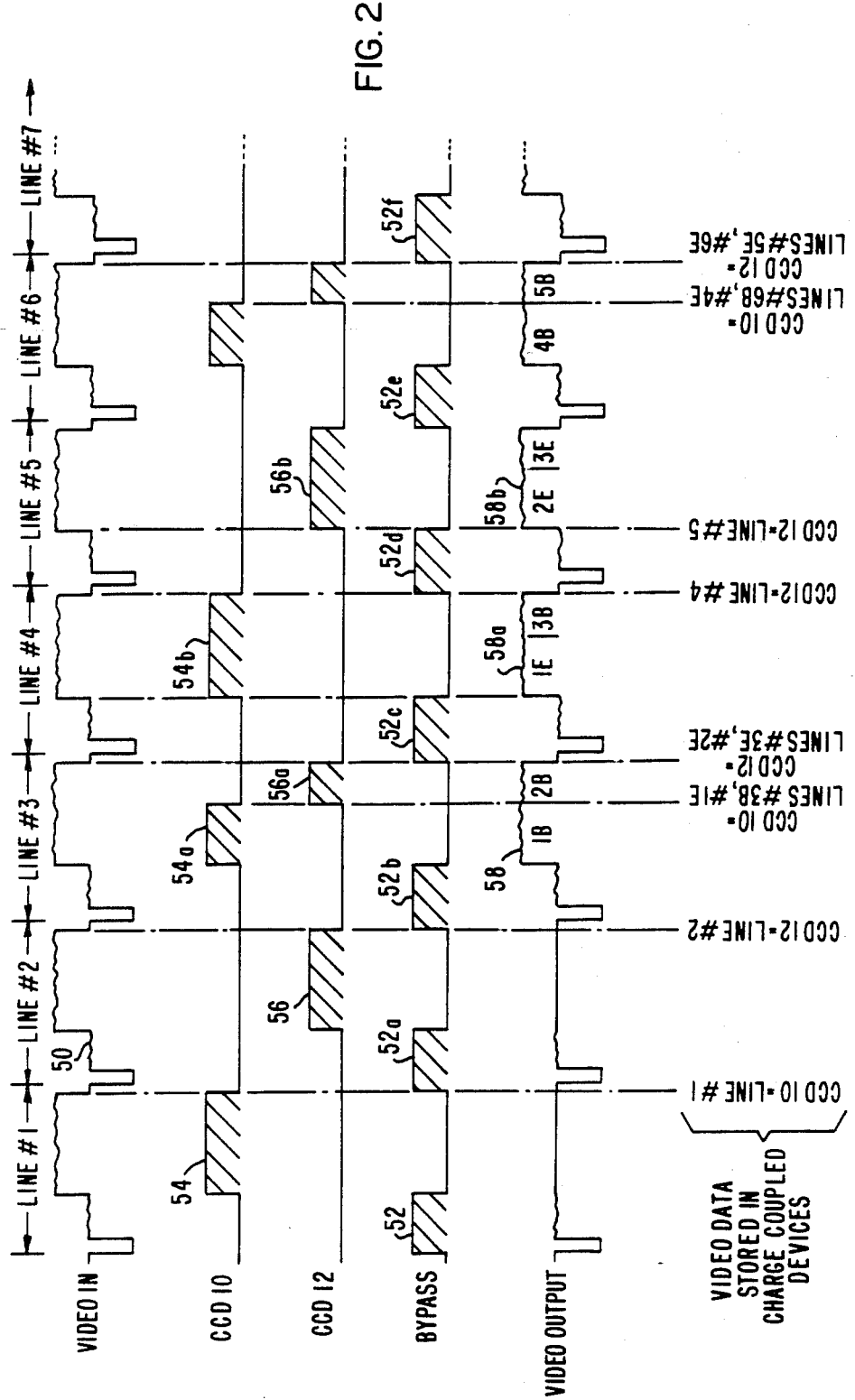
FIG. 2 is a diagram of waveforms illustrated in the embodiment of the invention.

A portion of a standard unscrambled television video signal is illustrated at reference numeral 50 in FIG. 2. This signal is representative of the video input signal to the scrambler illustrated in FIG. 1. More specifically, the portion of the video signal illustrated at reference numeral 50 begins with the first video line following the vertical blanking interval. The illustrated video lines are then numbered line 1 through line 6 corresponding to the first six lines immediately following the vertical blanking interval.

Immediately preceding the leading edge of the horizontal synchronizing pulse associated with the first (1) video line, the control logic circuit 20 of FIG. 1 initiates hold signals which are coupled to the charge couple devices 10 and 12 to prohibit shifting of these devices. Additionally, a signal is coupled to switching transistor 48 to turn on this transistor coupling the output signal of amplifier 42 to the signal input terminal of the buffer amplifier 30. This completes a bypass path from the input to the output of the scrambler system through amplifiers 42 and 30. This signal path is utilized to bypass the synchronizing portion of each line of the video signal including the color burst around the charge coupled devices 10 and 12 and directly to the signal output terminal of the scrambler. The time interval during which this mode of operation is maintained for the first line of the video signal is illustrated at reference numeral 52 in FIG. 2. Similarly the same mode of operation is utilized to bypass the synchronization portion of each subsequent line of the video (TV) signal with the time intervals for the first seven video lines being illustrated at reference numerals 52a through 52f in FIG. 1.

For the video portions of the first line following the vertical blanking interval the first charge coupled device 10 is shifted (clocked) to store data representing the entire video portion of this line in the first charge coupled device 10. The time interval during which this storage occurs is illustrated at reference numeral 54 of FIG. 2. Immediately following storage of the data representing the video portion of the first line, shifting of charge coupled device 10 is inhibited and the bypass of the sync signals is initiated as indicated at reference numeral 52a. Following the bypass of the second synchronizing pulse as illustrated at reference numeral 52a, shifting of the second charge coupled device 12 is initiated as illustrated at reference numeral 56. Shifting of the second charge coupled device 12 continues for the entire video portion of the second line of the video signal to store data representing the video portion of the second scan line. Immediately following the storage of the second line of video, shifting of charge coupled devices 10 and 12 is inhibited and the bypass cycle is again initiated as illustrated at reference numeral 52b to bypass the synchronization portion of the third line of the video around the charge coupled devices and directly to the signal output terminal of the scrambler. Following the bypass of the sync pulse for the third line shifting of the first charge coupled device 10 is initiated as illustrated at reference numeral 54a of the waveform. Shifting of the first charge coupled device 10 initiates storage of data representing the video portion of the third line in the first charge coupled device 10 and the shifting out of the previously stored data representing the video signal corresponding to the beginning portion of the first line. During this time interval switching transistor 28 (FIG. 1) is turned off and switching transistor 32 (FIG. 1) is turned on to couple the output signal of the first charge coupled device 10 to the signal output terminal via amplifier 26 and switch 32. At a point during the active video line determined by the output signal of the pseudo random number generator 22, shifting of the first charge coupled device 10 is terminated, shifting of the second charge coupled device 12 begins, transistor 32 is turned off and transistor 40 is turned on. This couples the previously stored signal representing the video signal corresponding to the beginning of the first line of the second video line to the signal output terminal of the system and is identified at reference numeral 58 by the label 1B and 2B. The intervals during the third line of the video signal during which charge coupled devices 10 and 12 are shifted is illustrated at reference numerals 54a and 56a. The resulting scrambled line of video is illustrated at reference numeral 58. During the video portion of the fourth line, charge coupled device 10 is shifted to store the video corresponding to the fourth video line and output a line of scrambled video as illustrated at reference numeral 58a. Similarly, during the fifth line of video, the fifth line is stored and the scrambled word illustrated at reference number 58b is generated. The above cycle is repeated for subsequent lines of the video signal with the output signal as the random number generator 32 being changed for each three lines.

Switching transistors 28, 38 and 46 are used to equalize the charge on capacitors 34, 38 and 44. This is accomplished by turning these transistors on during an unused line of the vertical blanking interval and clocking charge coupled devices 10 and 12 in the normal manner. This controls the DC level of the video output signal.

As a further aid in understanding the operation of the scrambler, the data content of the charge coupled devices 10 and 12 is illustrated in FIG. 2 by notes positioned at points where clocking of the charge coupled devices 10 and 12 is terminated.

A careful examination of the waveforms in FIG. 2 clearly indicates that the resultant TV signal is scrambled by interchanging portions of the video corresponding to three adjacent lines of the signal. This results in the scrambled video being shifted two horizontal synchronizing pulses with respect to the unscrambled signal. Additionally, it should be noted that the same hardware arrangement illustrated in FIG. 1 can be used either as a scrambler or a descrambler. The only difference being that for the descrambler the pseudo random number generator 22 must be synchronized with the scrambling generator. This can be conveniently done by inserting the necessary starting code for the pseudo random number generators into the unused portion of lines occurring during the vertical blanking interval. Techniques for accomplishing this are well known in the prior art, for example, the various patents referenced in the description of the prior art disclose suitable techniques. Additionally, it should be noted that if desired, the shift in the video with respect to the horizontal synchronizing pulses can be eliminated by introducing a time delay corresponding to two lines of the video signal in the bypass path through amplifier 42 and switching transistor 48.

Figure 3:
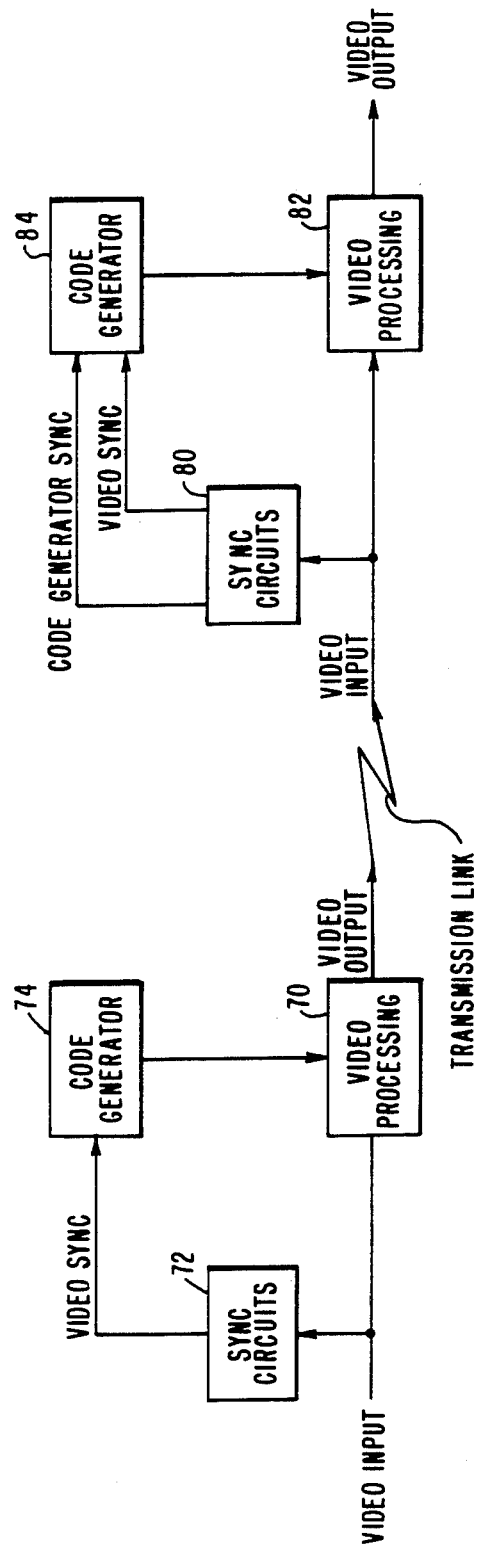
FIG. 3 is a block diagram of a system for transmitting and receiving a TV signal in accordance with the invention.

FIG. 3 illustrates a complete communication system using both a scrambler and descrambler, in accordance with the teachings of the invention. More specifically, the video to be transmitted is coupled to a scrambler 30 which includes a video processing unit 70 and a sync circuit 72. Sync circuit 72 recovers the synchronizing data and couples video sync signals to a scrambling code generator 74 (which may be a pseudo random number generator, as discussed previously with reference to FIG. 1). The code generator 74 generates all the coding and control signals necessary for the video processing circuit 70 to scramble the video, as previously described with reference to FIG. 1.

The scrambled video is then transmitted using any convenient transmission system. At the receiving point, the scrambled video is coupled to a descrambler. A sync signal circuit 80 and a video processing circuit 82 receives the scrambled video as an input. In response, the sync circuit 80 recovers the video sync signals and the code generator synchronizing data signals. These signals are coupled to the code generator 84 to synchronize the code sequence with the scrambler code generator and to generate the control signals for the video processing circuit 82. Except for synchronization of the code generator 84 with code generator 70, the operation of the descrambler is identical with the scrambler. Therefore, its operation is not described in detail. Also methods for synchronizing the two code generators are well known in the art.

The system described above can be modified without deviating from the concept of the invention. For example, it should be possible to use less than one line of storage capability with a plurality of segments of each line being treated in the same fashion as whole lines are treated in the above described illustration of the preferred embodiment of the invention. Additionally, other types of memories, for example, digital memories could be used. Additionally, it may be desirable to incorporate a gain and DC level adjustments in amplifiers 26, 28 and 42 in order to match the gain through various paths in the scrambler. Other techniques other than pseudo random numbers can be utilized to determine the shifting patterns of the memories. However, it is believed that pseudo random numbers of the type discussed will provide the highest level of security.

What we claim is:

1. Apparatus for scrambling the video portion of a TV signal, comprising:
   (1) a first serial first in first out memory for storing data corresponding to a full line of the video portion of said TV signal;
   (2) a second first in first out serial memory for storing data corresponding to a full line of the video portion of said TV signal;
   (3) control means for sequentially
      (a) reading data representing first and second selected segments of said video portion of said TV signal stored in said first memory to form a line of scrambled video and storing data representing the video portion of a selected line of said TV signal in said first memory;
      (b) reading data representing third and fourth selected segment of said video portion of said TV signal stored in said second memory to form a line of scrambled video and storing data in said second memory representing the video portion of a second selected line of said TV signal;
      (c) reading data representing a fifth selected segment of said video portion of said TV signal stored in said first memory and storing data in said first memory representing a seventh segment of the video of a third selected line of said TV signal;
      (d) reading data representing a sixth segment of said video portion of said TV signal stored in said second memory and storing in said second memory data representing an eighth segment of the video signal of the third selected line of said TV signal;
      (e) forming a scrambled video signal comprising said data read from said first and second memories during steps (a) through (d), and
   (4) cyclically repeating steps (a) through (e) for a time interval equal to the duration of the TV signal to be scrambled.

2. Apparatus for scrambling at least the video portion of a TV signal, comprising:
   (1) a first serial memory;
   (2) a second serial memory;
   (3) first control means for
      (a) during line interval "N", storing data representing the video portion of line "N" in said first memory during line interval "N";
      (b) reading data representing the end segment of line "N−3" from said first memory during line interval "N";
      (c) reading data representing the beginning segment of the video portion of line "N−1" from said first memory;
   (4) second control means for
      (a) during line interval "N+1" storing data representing the video portion of line "N+1" in said second memory;
      (b) during line interval "N+1" read data representing the end segment of the video portion of line "N−2" from said second memory;
      (c) during line interval "N+1" reading data representing the end segment of the video portion of line "N−1" from said second memory;
   (5) third control means for (a) during line interval "N+2" storing data representing the beginning segment of the video portion of line "N+2" in said first memory;
(b) during line interval "N+2" storing data representing the video portion of the end segment of line "N+2" in said second memory;
(c) during line interval "N+2" reading data representing the beginning segment of the video portion of line "N" from said first memory;
(d) during line interval "N+2" reading data representing the beginning segment of the video portion of scan line "N+1" from said second memory;

(6) combining means for combining the data read from said first and second memories with the synchronizing signals of said TV signal to produce said scrambled TV signal.

3. Apparatus for descrambling at least the video portion of a TV signal, comprising:
(1) a first serial memory;
(2) a second serial memory;
(3) first control means for
  (a) during line interval "N", storing data representing the video portion of line "N" in said first memory during line interval "N";
  (b) reading data representing the end segment of line "N−3" from said first memory during line interval "N";
  (c) reading data representing the beginning segment of the video portion of line "N−1" from said first memory;
(4) second control means for
  (a) during line interval "N+1" storing data representing the video portion of line "N+1" in said second memory;
  (b) during line interval "N+1" read data representing the end segment of the video portion of line "N−3" from said second memory;
  (c) during line interval "N+1" reading data representing the end segment of the video portion of line "N−1" from said second memory;
(5) third control means for
  (a) during line interval "N+2" storing data representing the beginning segment of the video portion of line "N+2" in said first memory;
  (b) during line interval "N+2" storing data representing the video portion of the end segment of line "N+2" in said second memory;
  (c) during line interval "N+2" reading data representing the beginning segment of the video portion of line "N" from said first memory;
  (d) during line interval "N+2" reading data representing the beginning segment of the video portion of scan line "N+1" from said second memory;
(6) combining means for combining the data read from said first and second memories with the synchronizing signals of said TV signal to produce said descrambled TV signal.

* * * * *